US008481941B2

(12) United States Patent
Sun et al.

(10) Patent No.: US 8,481,941 B2
(45) Date of Patent: Jul. 9, 2013

(54) DUAL FUNCTION INJECTION TYPE ARRAY READOUT DEVICE AND CIRCUIT AND DUAL FUNCTION READOUT MODULE

(75) Inventors: Tai-Ping Sun, Jhongli (TW); Yi-Chuan Lu, Lieyu Township, Kinmen County (TW)

(73) Assignee: National Chi Nan University (TW)

( * ) Notice: Subject to any disclaimer, the term of this patent is extended or adjusted under 35 U.S.C. 154(b) by 34 days.

(21) Appl. No.: 13/343,849

(22) Filed: Jan. 5, 2012

(65) Prior Publication Data

US 2012/0280129 A1    Nov. 8, 2012

(30) Foreign Application Priority Data

May 2, 2011    (TW) .............................. 100115349 A

(51) Int. Cl.
*G01J 5/20*    (2006.01)
(52) U.S. Cl.
USPC ..................................................... 250/338.4
(58) Field of Classification Search
USPC ................. 250/338.1–338.5, 339.01–339.15, 250/340, 341.1–341.8, 342–352
See application file for complete search history.

(56) References Cited

U.S. PATENT DOCUMENTS

| 5,554,849 | A  | * | 9/1996 | Gates ........................ 250/370.08 |
| 6,184,538 | B1 | * | 2/2001 | Bandara et al. .................. 257/21 |
| 6,870,565 | B1 | * | 3/2005 | Blerkom et al. .............. 348/294 |
| 2002/0011552 | A1 | * | 1/2002 | Sugiyama et al. .......... 250/208.1 |
| 2009/0173883 | A1 | * | 7/2009 | Kauffman et al. ......... 250/338.4 |

OTHER PUBLICATIONS

Ko et al., "Highly programmable temperature compensated readout circuit for capacitive microaccelerometer," 2010, Sensors and Actuators A, vol. 158, pp. 72-83.*

* cited by examiner

*Primary Examiner* — Kiho Kim
(74) *Attorney, Agent, or Firm* — Ostrolenk Faber LLP

(57) ABSTRACT

A dual function injection type array readout device includes at least two sensor groups and a dual function injection type array readout circuit. Each sensor group has two sensors of different functions, and each sensor generates a sense current according to a corresponding sensed target. The dual function injection type array readout circuit includes at least two dual function readout modules, each having two readout units, each electrically coupled to a respective sensor of a corresponding sensor group. Each readout unit includes a current-to-voltage converter having an integration capacitor, and a sample-and-hold device electrically coupled to the current-to-voltage converter. A switch unit is electrically coupled to the integration capacitors of the readout units.

19 Claims, 12 Drawing Sheets

DUAL FUNCTION INJECTION TYPE ARRAY READOUT DEVICE AND CIRCUIT AND DUAL FUNCTION READOUT MODULE

CROSS-REFERENCE TO RELATED APPLICATION

This application claims priority to Taiwanese Application No. 100115349, filed on May 2, 2011.

BACKGROUND OF THE INVENTION

1. Field of the Invention

The invention relates to a dual function injection type array readout device and circuit and to a dual function readout module.

2. Description of the Related Art

FIG. 1 shows a conventional infrared readout device having an infrared sensor D and a readout circuit 1, and disclosed in Longo, J. T., Cheung, D. T., Andrews, A. M., Wang, C. C., Tracy, J. M., "Infrared Focal Planes in Intrinsic Semiconductors," Solid-State Circuits, IEEE Journal of, vol. 13, no. 1, pp. 139-158, February 1978.

A sense current exists when operating the infrared sensor D with reverse bias voltage, and the sense current includes a photoelectric current attributed to the infrared signal and a dark current that does not correspond to the infrared signal. In other words, the infrared sensor D creates a photoelectric current with a magnitude corresponding to intensity of the infrared signal detected thereby, and a dark current exists regardless of whether or not the infrared sensor D detects an infrared signal. The infrared sensor D is a photo-transmission diode D having an anode, and a cathode electrically coupled to a reference bias COM.

The readout circuit 1 includes a readout unit 2 and an ON/OFF control unit 22. The readout unit 2 includes a current-to-voltage converter 20 and a sample-and-hold device 21.

The current-to-voltage converter 20 includes a transistor M1, an integration capacitor CI, and an integration reset switch SIR. The current-to-voltage converter 20 is electrically coupled to the infrared sensor D to receive the sense current that is stored in the integration capacitor CI. The current-to-voltage converter 20 converts the sense current into an integration voltage that is directly proportional to the magnitude of the sense current.

The sample-and-hold device 21 is electrically coupled to the current-to-voltage converter 20. The sample-and-hold device 21 is controlled to sample and hold from the integration voltage to obtain an output voltage VOUT that is directly proportional to the magnitude of the sense current. The sample-and-hold device 21 includes a readout switch SSH, a sampling capacitor CSH, a sampling reset switch SRR, and an output switch MUL.

The transistor M1 includes a source electrically coupled to the anode of the photo-transmission diode D, a gate that receives a gate bias voltage VG, and a drain.

The integration capacitor CI includes a first terminal electrically coupled to and providing the integration voltage to the drain of the transistor M1, and a second terminal that receives a DC calibration potential Vadjust, which is used to adjust the initial value of the integration voltage.

The integration reset switch SIR is arranged parallel to the integration capacitor CI, and is operable to switch between conducting and non-conducting states. When the integration reset switch SIR conducts, the stored charge in the integration capacitor CI is cleared.

The readout switch SSH includes a first terminal electrically coupled to the drain of the transistor M1, and a second terminal, and is operable to switch between conducting and the non-conducting states.

The output switch MUL includes a first terminal electrically coupled to the second terminal of the readout switch SSH, and a second terminal providing an output voltage VOUT, and is operable to switch between conducting and the non-conducting states.

The sampling capacitor CSH includes a first terminal electrically coupled to the second terminal of the readout switch SSH, and a grounded second terminal.

The sampling reset switch SSR is arranged parallel to the sampling capacitor CSH, and is operable to switch between conducting and non-conducting states. When the sampling reset switch SSR conducts, the charge stored in the sampling capacitor CSH is cleared.

The ON/OFF control unit 22 is electrically coupled to the switches of the readout unit 2, and outputs multiple control signals to the corresponding switches to control operations of the switches in the conducting and non-conducting states. The operation of the readout unit 2 according to the control signals is described as follows:

The sense current generated by the infrared sensor D is injected, via the transistor M1, into the integration capacitor CI to perform the integration process and obtain the integration voltage. Prior to the integration process, the integration reset switch SIR is caused to conduct for some time to clear the charges inside the integration capacitor CI. After conducting the integration process for some time, the readout switch SSH is caused to conduct for some time to sample the integration voltage and store in the sampling capacitor CSH. The output switch MUL is then caused to conduct for some time so that the voltage at the first terminal of the sampling capacitor CSH is outputted as the output voltage VOUT. The sampling reset switch SSR is then caused to conduct for some time to clear the remaining charges from the sampling capacitor CSH. The above steps are repeated according to the control signals.

The conventional infrared readout device has the following drawbacks:

The magnitude of the dark current will vary with characteristics of the materials of the infrared sensor D. The magnitude of the dark current is influenced further by changes in the ambient temperature, background noise, and defects in the infrared sensor D. While the integration capacitor is fixed, the integration voltage may have a problem of over saturation when integrating due to excessively large dark current, and the integration voltage is thus not directly proportional to the magnitude of the sense current generated by the infrared sensor D, causing the readout of the output voltage VOUT to be incorrect.

SUMMARY OF THE INVENTION

Therefore, an object of the present invention is to provide a dual function injection type array readout device capable of alleviating the problem of oversaturation when integrating.

According to this invention, a dual function injection type array readout device comprises:

at least two sensor groups, each of the sensor groups having two sensors of different functions, each of the sensors generating a sense current according to a corresponding sensed target; and a dual function injection type array readout circuit including:

at least two dual function readout modules, each including:

two readout units, each electrically coupled to a respective one of the sensors of a corresponding one of the sensor groups, each of the readout units including:
a current-to-voltage converter having an integration capacitor, being electrically coupled to the respective one of the sensors, and controllable to selectively receive the sense current from the respective one of the sensors, wherein when the current-to-voltage converter receives the sense current, the sense current is stored in the integration capacitor for conversion into an integration voltage that is proportional to magnitude of the sense current; and
a sample-and-hold device electrically coupled to the current-to-voltage converter, and controllable to sample and hold the integration voltage to obtain an output voltage that is proportional to the magnitude of the sense current; and
a switch unit electrically coupled to the integration capacitors of the readout units, and controllable to selectively connect the integration capacitors in parallel with each other.

Another object of the present invention is to provide a dual function injection type array readout circuit.

According to this invention, a dual function injection type array readout circuit is for use with at least two sensor groups. Each of the sensor groups has two sensors of different functions. Each of the sensors generates a sense current according to a corresponding sensed target. The dual function injection type array readout circuit comprises:
at least two dual function readout modules, each including:
two readout units, each to be electrically coupled to a respective one of the sensors of a corresponding one of the sensor groups, each of the readout units including:
a current-to-voltage converter having an integration capacitor, to be electrically coupled to the respective one of the sensors, and controllable to selectively receive the sense current from the respective one of the sensors, wherein when the current-to-voltage converter receives the sense current, the sense current is stored in the integration capacitor for conversion into an integration voltage that is proportional to magnitude of the sense current; and
a sample-and-hold device electrically coupled to the current-to-voltage converter, and controllable to sample and hold the integration voltage to obtain an output voltage that is proportional to the sense current; and
a switch unit electrically coupled to the integration capacitors of the readout units, and controllable to selectively connect the integration capacitors in parallel with each other.

Yet another object of the present invention is to provide a dual function readout module. According to this invention, a dual function readout module is for use with two sensors of different functions. Each of the sensors generates a sense current according to a corresponding sensed target. The dual function readout module comprises:
two readout units, each including:
a current-to-voltage converter having an integration capacitor, to be electrically coupled to a respective one of the sensors, and controllable to selectively receive the sense current from the respective one of the sensors, wherein when the current-to-voltage converter receives the sense current, the sense current is stored in the integration capacitor for conversion into an integration voltage that is proportional to magnitude of the sense current; and
a sample-and-hold device electrically coupled to the current-to-voltage converter, and controllable to sample and hold the integration voltage to obtain an output voltage that is proportional to the magnitude of the sense current; and
a switch unit electrically coupled to the integration capacitors of the readout units, and controllable to selectively connect the integration capacitors in parallel with each other.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
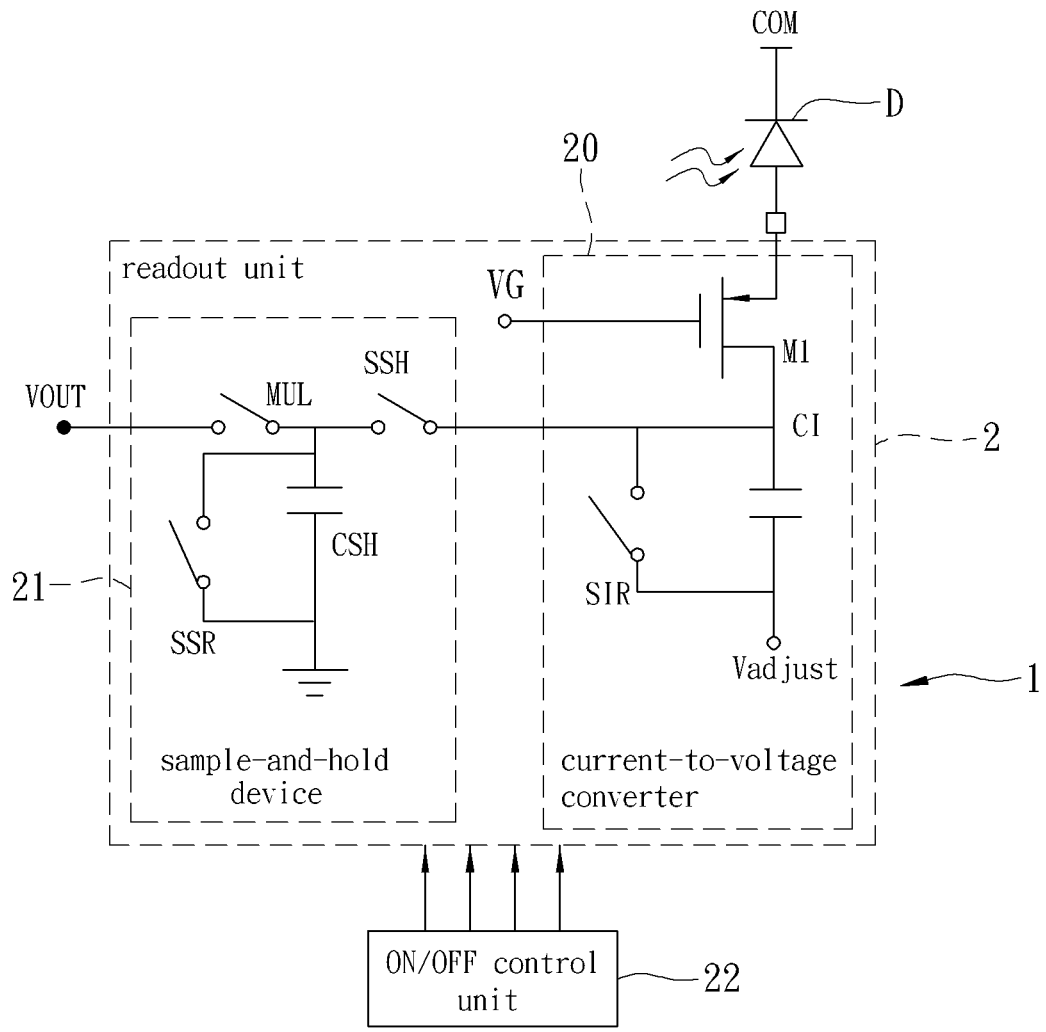
FIG. 1 is a circuit diagram of a conventional infrared readout device.
Figure 2:
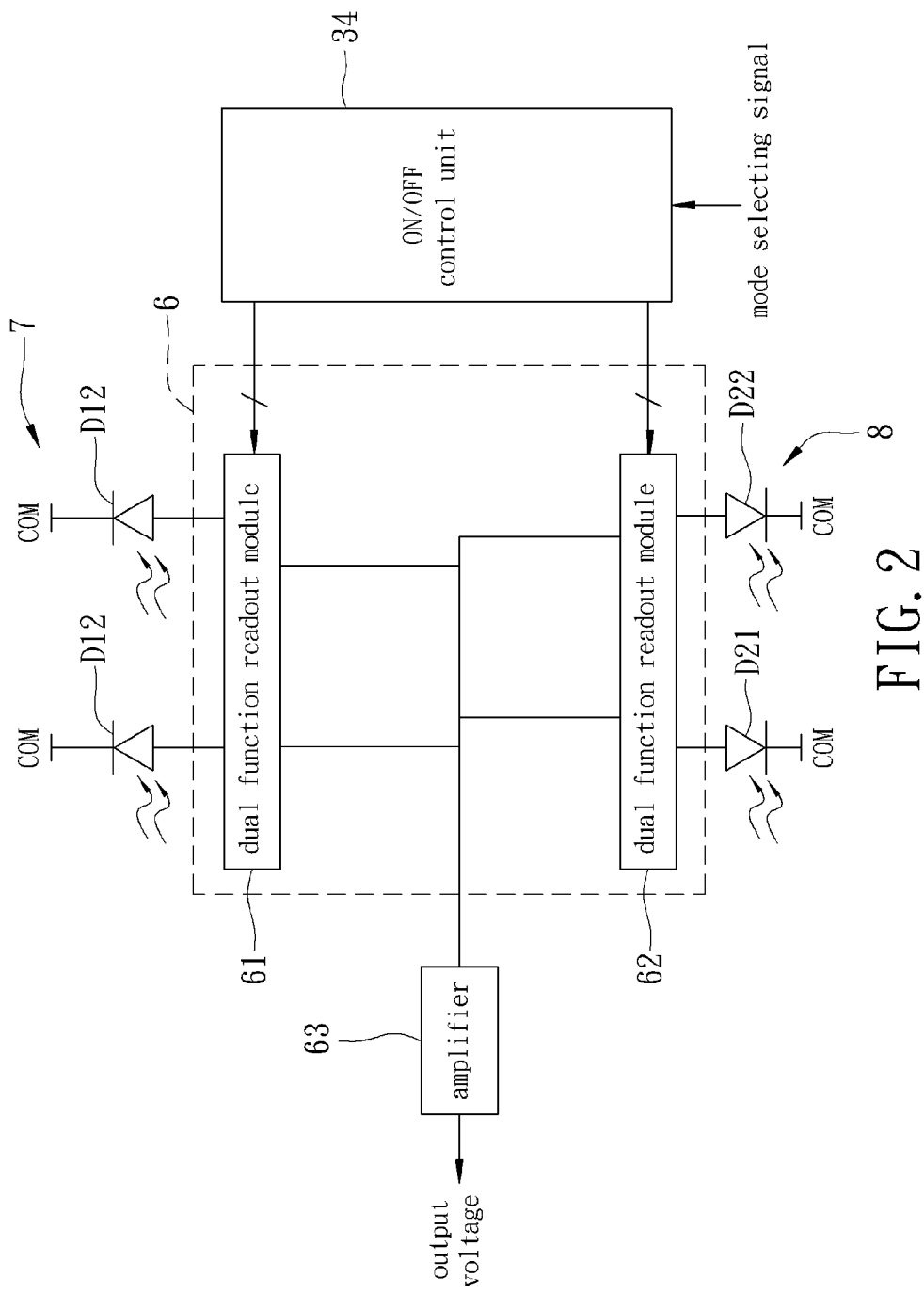
FIG. 2 is a circuit diagram of the first preferred embodiment of a dual function injection-type array readout device according to the present invention.

FIG. 2 shows the first preferred embodiment of the dual function injection type array readout device of the present invention. The dual function injection type array readout device is electrically coupled to an amplifier 63, is controlled by an ON/OFF control unit 34, and includes at least two sensor groups 7, 8, and a dual function injection type array readout circuit 6.

Each sensor group 7, 8 includes two sensors that have different functions, and are, respectively, sensors D11, D12, D21, D22. The sensors D11, D12 sense two different sensed targets, and generate sense currents according to the corresponding sensed target. In this embodiment, the two sensors D11, D12 are infrared sensors for sensing infrared signals having different wavelengths, respectively. The two sensed targets are, respectively, a long wave band infrared signal and a mid wave band infrared signal. The sense current includes a photo electric current with a magnitude related to intensity of the corresponding infrared signal and a dark current not related to the infrared signal and that changes because of other factors (e.g., temperature of the environment). The other two sensors D21, D22 have, respectively, the same functions as the sensors D11, D12, and are therefore not described herein.

The dual function injection type array readout circuit 6 includes at least two dual function readout modules, i.e., a first dual function readout module 61 and a second dual function readout module 62. The first and second dual function readout modules 61, 62 form a 1×2 array in this embodiment. The number of dual function readout modules is not restricted as long as it corresponds to the number of sensor groups to form arrays.

Figure 3:
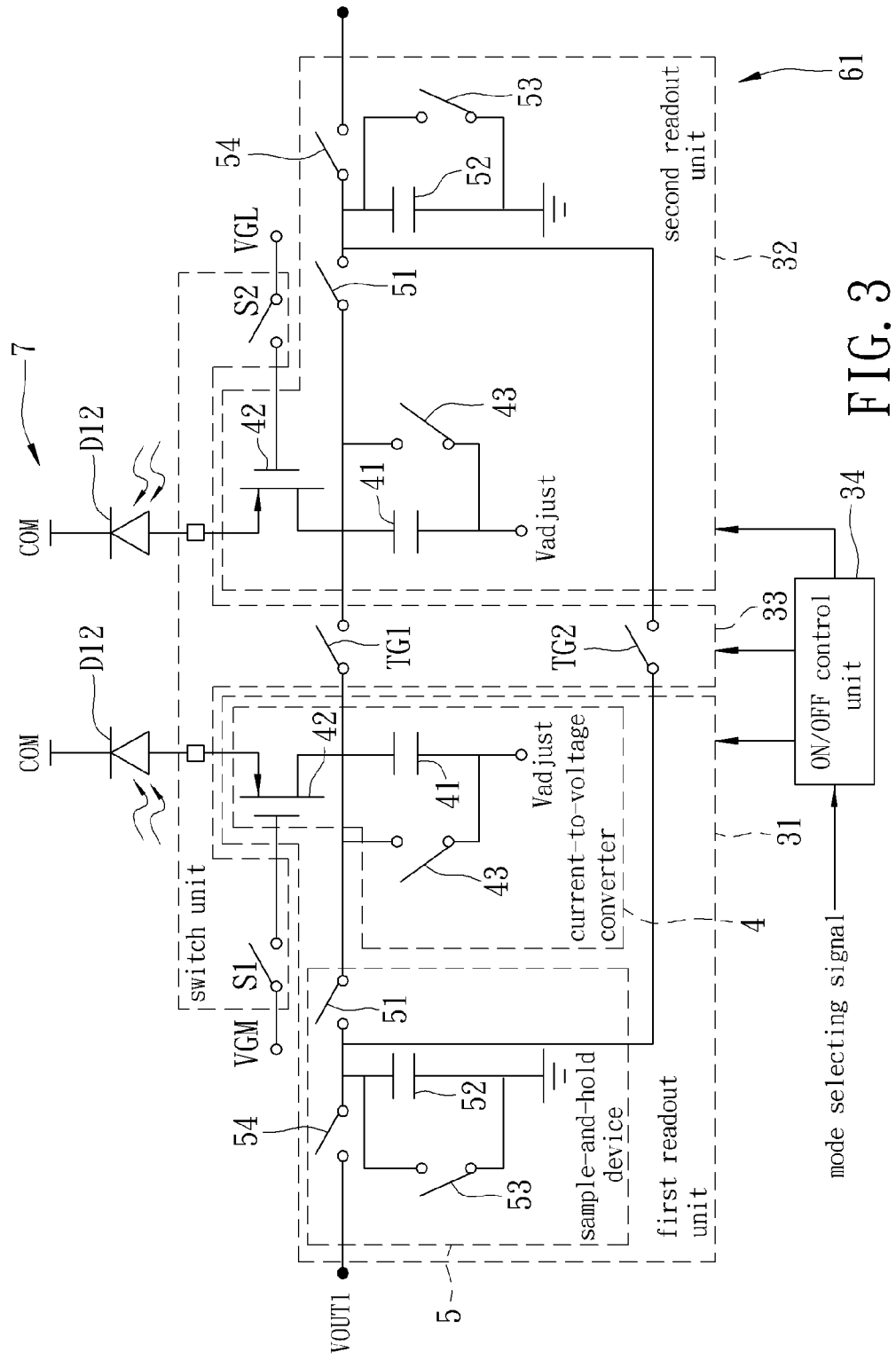
FIG. 3 is a circuit diagram of a dual function readout module of the preferred embodiment.

As shown in FIG. 3, each of the first and second dual function readout modules 61, 62 includes two readout units 31, 32 electrically coupled to a respective one of the sensors D11, D12, D21, D22 of a corresponding one of the sensor groups 7, 8, and a switch unit 33. For convenience of description, only the first dual function readout module 61 is illustrated.

Each readout unit 31, 32 includes a current-to-voltage converter 4 and a sample-and-hold device 5.

The current-to-voltage converter 4 includes an integration capacitor 41, a transistor 42 and an integration reset switch 43. The current-to-voltage converter 4 is electrically coupled to the corresponding sensor D11, D12 and is controlled to selectively receive the sense current from the respective sensor D11, D12. When the current-to-voltage converter 4 receives the sense current, the sense current is stored in the integration capacitor 41 for conversion into an integration voltage Vint that is directly proportional to the magnitude of the sense current, as shown by Equation (A):

$$V_{int} = \frac{1}{C_{int}} \int_0^t I(t) \, dt \quad \text{Equation (A)}$$

wherein the parameter $C_{int}$ is the integration capacitance, and parameter t is the integration time.

The sample-and-hold device 5 is electrically coupled to the current-to-voltage converter 4, and is controllable to sample and hold the integration voltage to obtain an output voltage that is directly proportional to the magnitude of the sense current. The sample-and-hold device 5 includes a readout switch 51, a sampling capacitor 52, a sampling reset switch 53, and an output switch 54.

Below is the detailed description of the above mentioned elements:

The integration capacitor 41 has a first terminal that provides the integration voltage, and a second terminal that receives a direct current (DC) calibration voltage Vadjust. The calibration voltage Vadjust is used to adjust the initial value of the integration voltage. In this embodiment, the calibration voltage Vadjust is preset to be 0, but is not restricted to this value.

The transistor 42 has a first terminal (source terminal) electrically coupled to the corresponding sensor D11, D12 a second terminal (drain terminal) electrically coupled to the first terminal of the integration capacitor 41 of the corresponding readout unit 31, 32, and a control terminal (gate terminal).

The integration reset switch 43 is arranged parallel to the integration capacitor 41 of the corresponding readout unit 31, 32, is operable to switch between conducting and non-conducting states, and clears the stored charges in the integration capacitor 41 of the corresponding readout unit 31, 32 when the integration reset switch 43 is operated in the conducting state.

The readout switch 51 has a first terminal electrically coupled to the second terminal of the transistor 42 of the corresponding readout unit 31, 32, and a second terminal. The readout switch 51 is operable to switch between conducting and non-conducting states.

The output switch 54 has a first terminal electrically coupled to the second terminal of the readout switch 51, and a second terminal providing the output voltage VOUT1. The output switch 54 is operable to switch between conducting and non-conducting states.

The sampling capacitor 52 has a first terminal electrically coupled to the second terminal of the readout switch 51, and a grounded second terminal.

The sampling reset switch 53 is arranged parallel to the sampling capacitor 52, is operable to switch between conducting and non-conducting states, and clears the stored charge in the sampling capacitor 52 when the sampling reset switch 53 is operated in the conducting state.

The two readout units are, respectively, a first readout unit 31 and a second readout unit 32.

The switch unit 33 is operable to selectively transmit a first bias voltage VGM to the control terminal of the transistor 42 of the first readout unit 31, and is further operable to selectively transmit a second bias voltage VGL to the control terminal of the transistor 42 of the second readout unit 32. The switch unit 33 is electrically coupled between the first terminals of the integration capacitors 41. of the first and second readout units 31, 32, and is electrically coupled between the first terminals of the sampling capacitors 52 of the first and second readout units 31, 32. The switch unit 33 is controllable to selectively connect the two integration capacitors 41 in parallel with each other, and to selectively connect the two sampling capacitors 52 in parallel with each other.

The switch unit 33 includes a first bias voltage switch S1, a second bias voltage switch S2, an integration parallel switch TG1, and a sampling parallel switch TG2.

The first bias voltage switch S1 has a first terminal to receive the first bias voltage VGM, and a second terminal electrically coupled to the control terminal of the transistor 42 of the first readout unit 31, and is operable to switch between conducting and non-conducting states. When the first bias voltage switch S1 conducts, the first bias voltage VGM is transmitted to the control terminal of the transistor 42 of the first readout unit 31.

The second bias voltage S2 has a first terminal to receive the second bias voltage VGL, and a second terminal electrically coupled to the control terminal of the transistor 42 of the second readout unit 32, and is operable to switch between conducting and non-conducting states. When the second bias voltage switch S2 conducts, the second bias voltage VGL is transmitted to the control terminal of the transistor 42 of the second readout unit 32.

The integration parallel switch TG1 has a first terminal electrically coupled to the first terminal of the integration capacitor 41 of the first readout unit 31, and a second terminal electrically coupled to the first terminal of the integration capacitor 41 of the second readout unit 32, and is operable to switch between conducting and non-conducting states. When the integration parallel switch TG1 conducts, the two integration capacitors 41 are arranged in parallel with each other.

The sampling parallel switch TG2 has a first terminal electrically coupled to the first terminal of the sampling capacitor 52 of the first readout unit 31, and a second terminal electrically coupled to the first terminal of the sampling capacitor 52 of the second readout unit 32, and is operable to switch between conducting and non-conducting states. When the sampling parallel switch TG2 conducts, the two sampling capacitors 52 are arranged in parallel with each other.

Each sensor D11, D12 includes a photo-transmission diode. Each photo-transmission diode D11, D12 has a cathode to receive a reference bias voltage COM, and an anode electrically coupled to the current-to-voltage converter 4 of the corresponding readout unit 31, 32.

Figure 4:
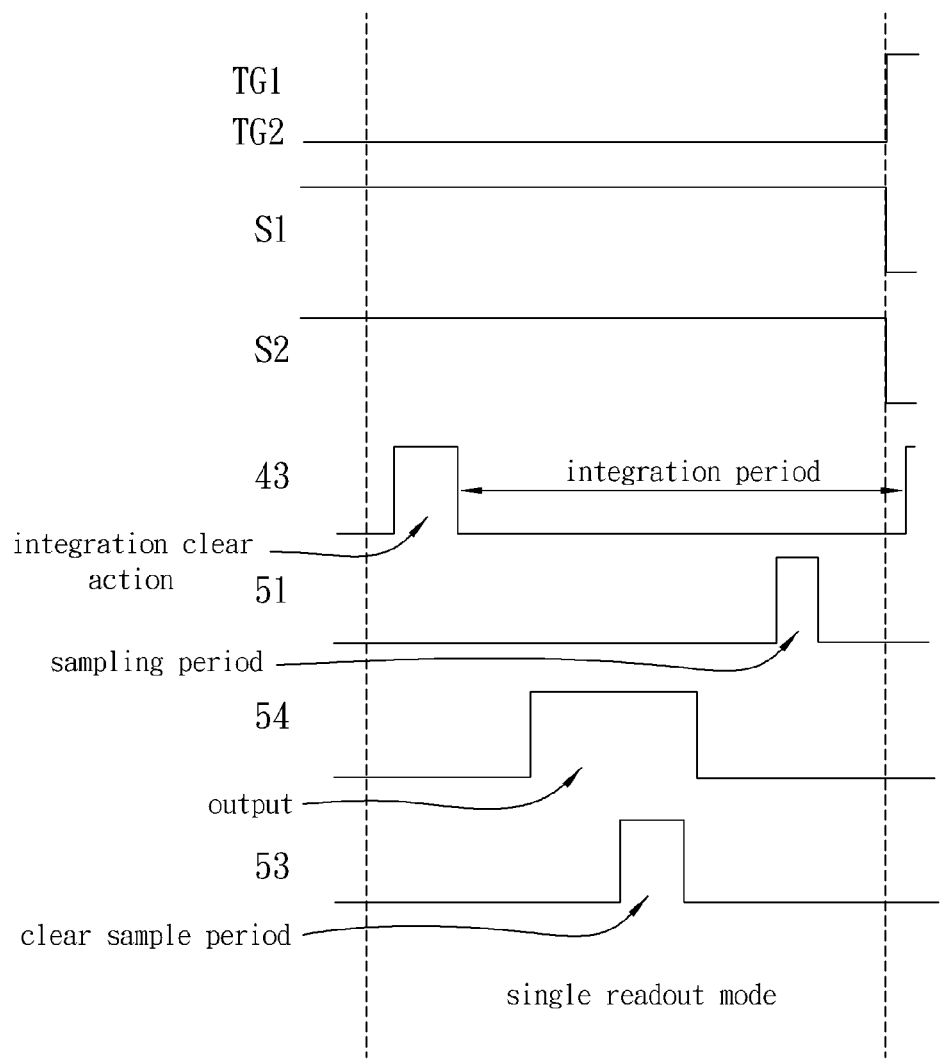
FIG. 4 is a timing diagram of a first mode of the dual function readout module.

The ON/OFF control unit 34 is electrically coupled to the two readout units 31, 32 of each dual function readout module 61, 62, and the switches S1, S2, TG1, TG2, 43, 51, 53, 54. The ON/OFF control unit 34 also outputs multiple control signals to the switches S1, S2, TG1, TG2, 43, 51, 53, 54 so the switches S1, S2, TG1, TG2, 43, 51, 53, 54 switch between the conducting and non-conducting states, with the time order of the control signals shown in FIGS. 3, 4 and 5. The ON/OFF control unit 34 is to receive a mode selecting signal, and to control operation of the readout device among three modes according to the mode selecting signal. The three modes are, respectively, a single readout mode, a capacitor sharing mode, and a dual readout mode, with different operating states of the switches as described below:

Referring to FIG. 4, when the mode selecting signal indicates the single readout mode, the integration parallel switch TG1 and the sampling parallel switch TG2 are both not conducting. When one of the two bias voltage switches S1, S2 is conducting, the readout device operates in the single readout mode. In the following description of the dual function readout modules 61, 62, the first bias voltage switch S1 is assumed to be conducting.

Assuming the readout device sensed an infrared signal in a period in the previous week, the sampling capacitor 52 stored an output voltage VOUT1 directly proportional to the magnitude of the sense current of the previous week. When an infrared signal is sensed within the current week, the first readout unit 31 receives the sense current and converts the sense current into an output voltage directly proportional to the magnitude of the sense current. A detailed description of the circuit operation follows:

The ON/OFF control unit 34 controls the first bias voltage switch S1 to conduct and prevents the second bias voltage switch S2 from conducting. The first bias voltage VGM is transmitted to the control terminal of the transistor 42 of the first readout unit 31 via the first bias voltage switch S1. The transistor 42 conducts to allow the sense current from the first sensor D1 to flow therethrough. The ON/OFF control unit 34 controls the integration reset switch 43 to conduct for a preset period to do an integration clear action by clearing the charges in the integration capacitor 41 of the first readout unit 31. The integration capacitor 41 then integrates the sense current according to an integration period to convert the sense current into an integration voltage directly proportional to the magnitude of the sense current. The ON/OFF control unit 34 subsequently controls the output switch 54 of the first readout unit 31 to conduct so as to allow the sampling capacitor 52 to output an output voltage VOUT1, via the output switch 54, directly proportional to the magnitude of the sense current of the previous week for processing an output action. Next, the ON/OFF control unit 34 controls the sampling reset switch 53 to conduct for a clear sample period so as to clear the charge inside the sampling capacitor 52 of the first readout unit 31 and reset the output voltage VOUT1 to zero.

The ON/OFF control unit 34 then controls the readout switch 51 of the first readout unit 31 to conduct for a sampling period, so that the integration voltage can charge the sampling capacitor 52 through the readout switch 51.

The ON/OFF control unit 34 can interchange the order of conduction of the output switch 54 in the first readout switch 31 of the two dual function readout modules 61, 62.

When the first bias voltage switch S1 does not conduct while the second bias voltage switch S2 conducts, the operation of the second readout unit 32 is the same as the aforementioned operation of the first readout unit 31, and is therefore not described herein.

Figure 5:
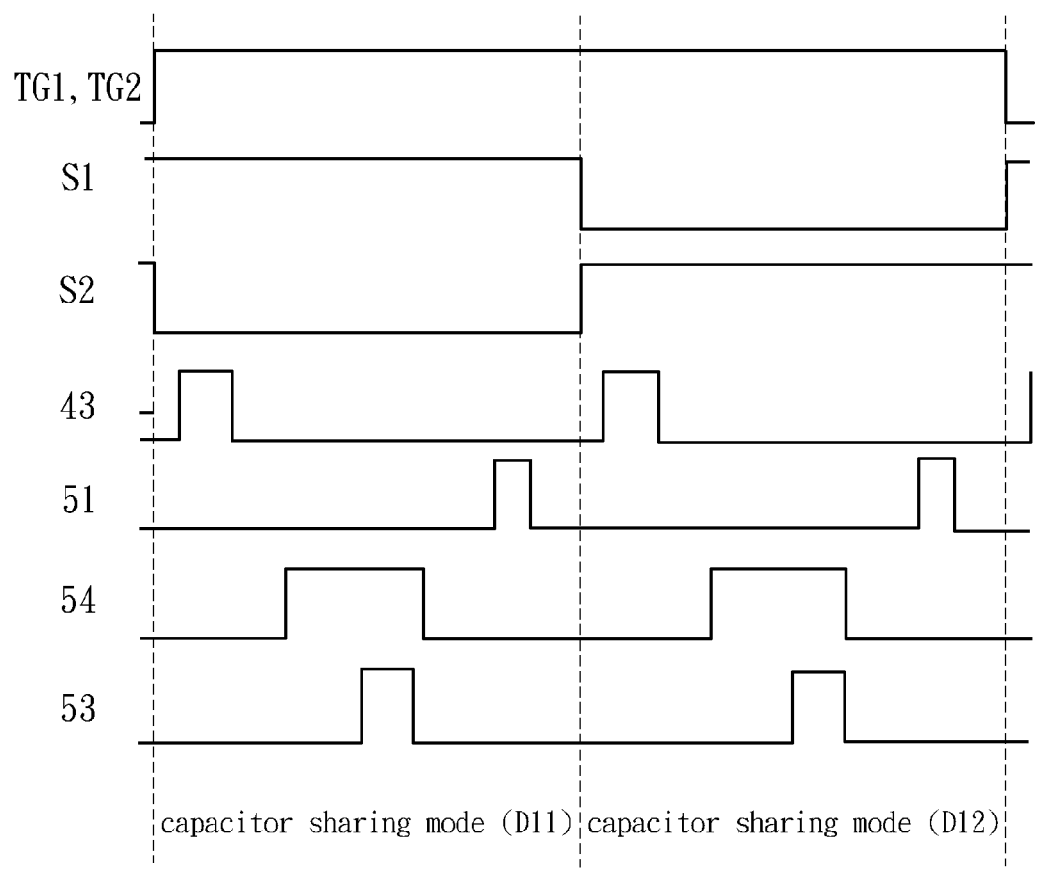
FIG. 5 is a timing diagram of a second mode of the dual function readout module.

Referring to FIG. 5, when the mode selecting signal indicates the capacitor sharing mode, the integration parallel switch TG1 and the sampling parallel switch TG2 are both conducting.

As the integration parallel switch TG1 is conducting, the capacitance used to do integration computation on the dark current increases from Cin1 to Cin1+Cin2, so as to solve the integration oversaturation problem. The parameters Cin1, Cin2 are respectively the capacitances of the integration capacitors 41 of the first and second readout units 31, 32.

As the sampling parallel switch TG2 is conducting, the capacitance used to do integration voltage charging increases from Csh1 to Csh1+Csh2. The parameters Csh1, Csh2 are respectively the capacitances of the sampling capacitors 52 of the first and second readout units 31, 32.

When the first bias voltage switch S1 is not conducting while the second bias voltage switch S2 is conducting, the operation of the second readout unit 32 is the same as the operation of the first readout unit 31, and is therefore not described herein.

Figure 6:
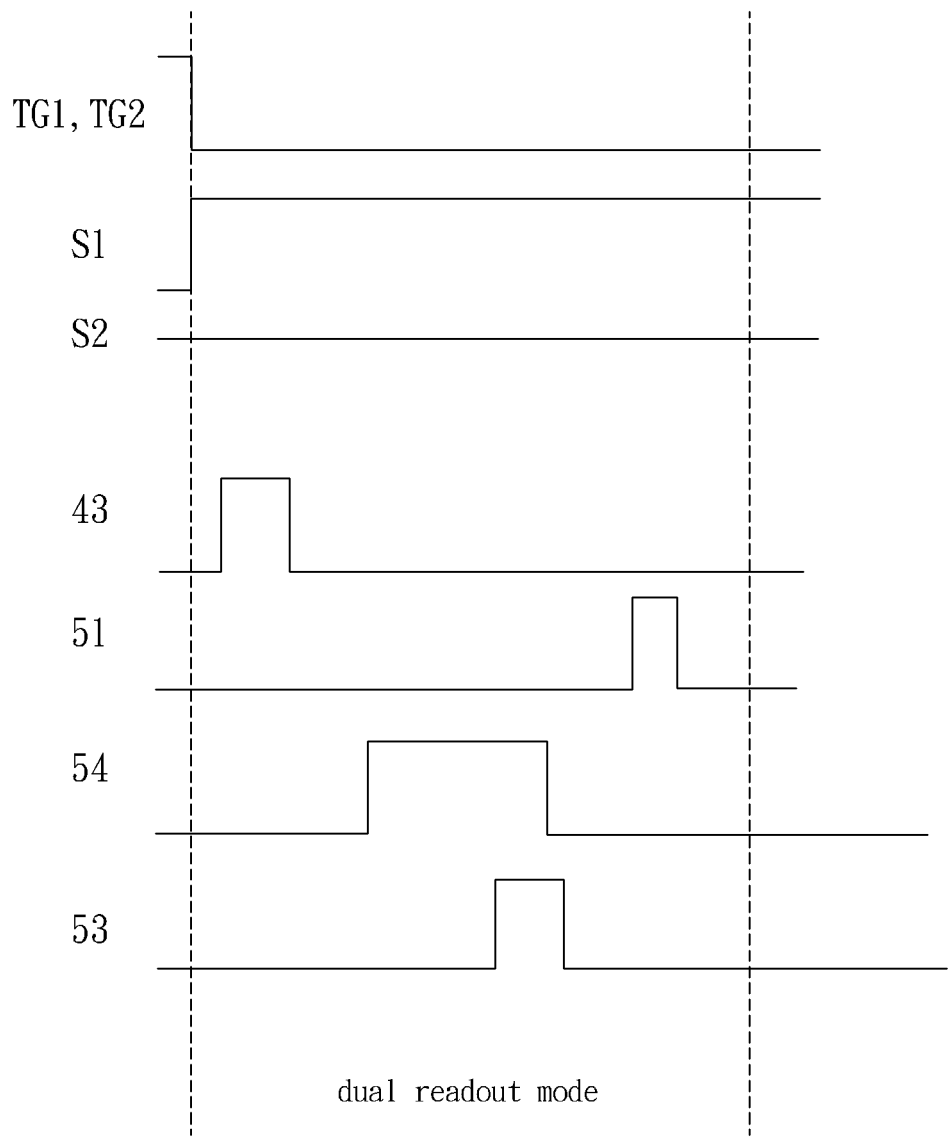
FIG. 6 is a timing diagram of a third mode of the dual function readout module.

Referring to FIG. 6, when the first and second bias voltage switches S1, S2 are both conducting, the first and second readout units 31, 32 respectively receive the two sense currents from the two sensors D11, D12. The operations of the two readout units 31, 32 are the same as the aforementioned operation in the single readout mode, and is therefore not described herein. The order of conduction of the four output switches 54 can be interchanged under the control of the ON/OFF control unit 34.

Figure 7:
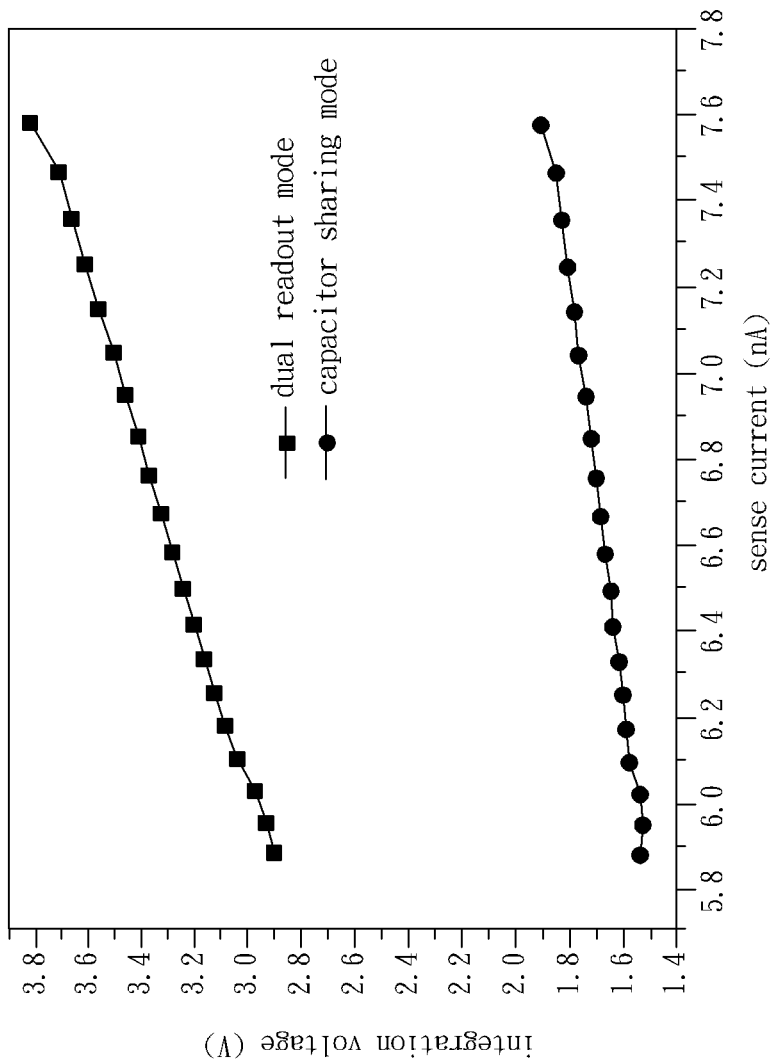
FIG. 7 shows a first experimental result of the dual function readout module.

FIG. 7 shows voltage versus current plots of the integration capacitors 41 in the capacitor sharing mode and the dual readout mode. When the sense current increases steadily with increasing temperature, the changes of the integration voltage in the integration capacitors 41 in the dual readout mode, without using capacitance sharing, are more intense. On the other hand, the changes of the integration voltage in the integration capacitors 41 in the capacitance sharing mode are less intense.

Figure 8:
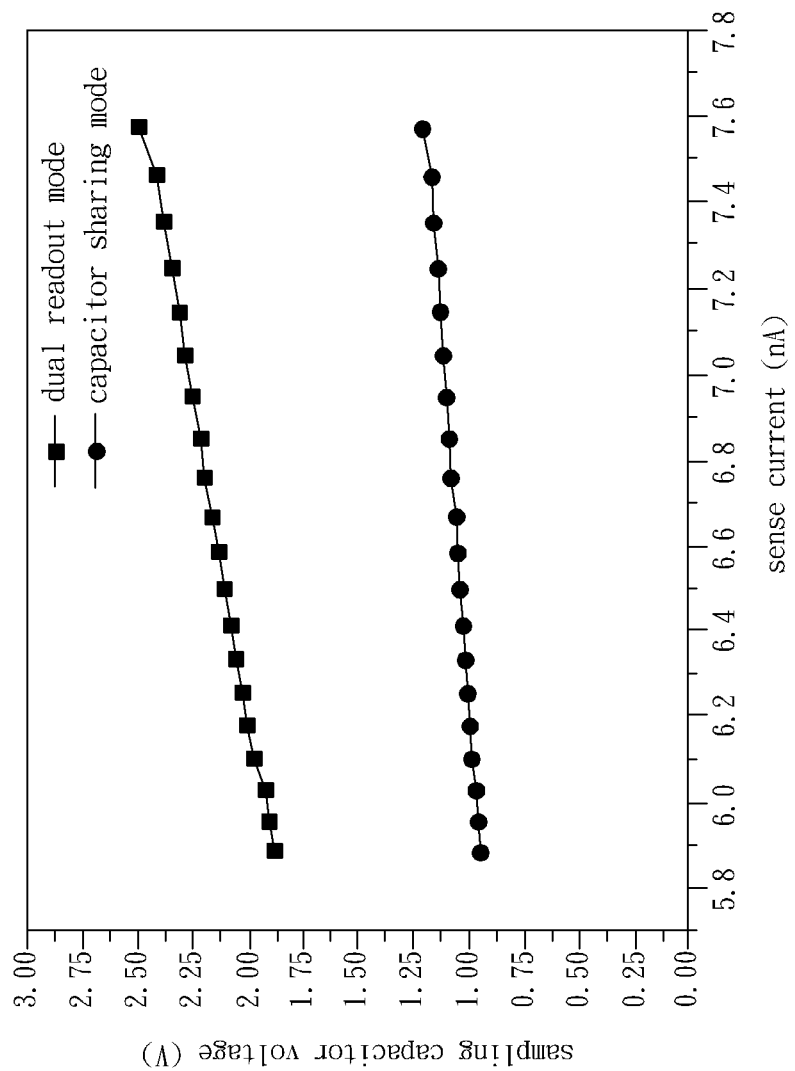
FIG. 8 shows a second experimental result of the dual function readout module.

FIG. 8 shows voltage versus current plots of the sampling capacitors 52 in the capacitor sharing mode and the dual readout mode. When the sense current increases steadily with increasing temperature, the changes of the voltage across the sampling capacitors 52 in the dual readout mode, without using capacitance sharing, are more intense. On the other hand, the changes of the voltage across the sampling capacitors 52 in the capacitance sharing mode are less intense.

As the operation and the circuit structure of the second dual function readout module 62 are the same as those the first dual function readout module 61, they will not be described herein. In the present embodiment, the first readout unit 31 of the first dual function readout module 61 is preset to be at the location first row, first column (1,1) in the array device. The second readout unit 32 of the first dual function readout module 61 is preset to be at the location first row, second column (1,2) in the array device. The first readout unit 31 of the second dual function readout module 62 is preset to be at the location second row, first column (2,1) of the array device. The second readout module 32 of the second dual function readout module 62 is preset to be at the location second row, second column (2,2) in the array device.

Figure 9A:
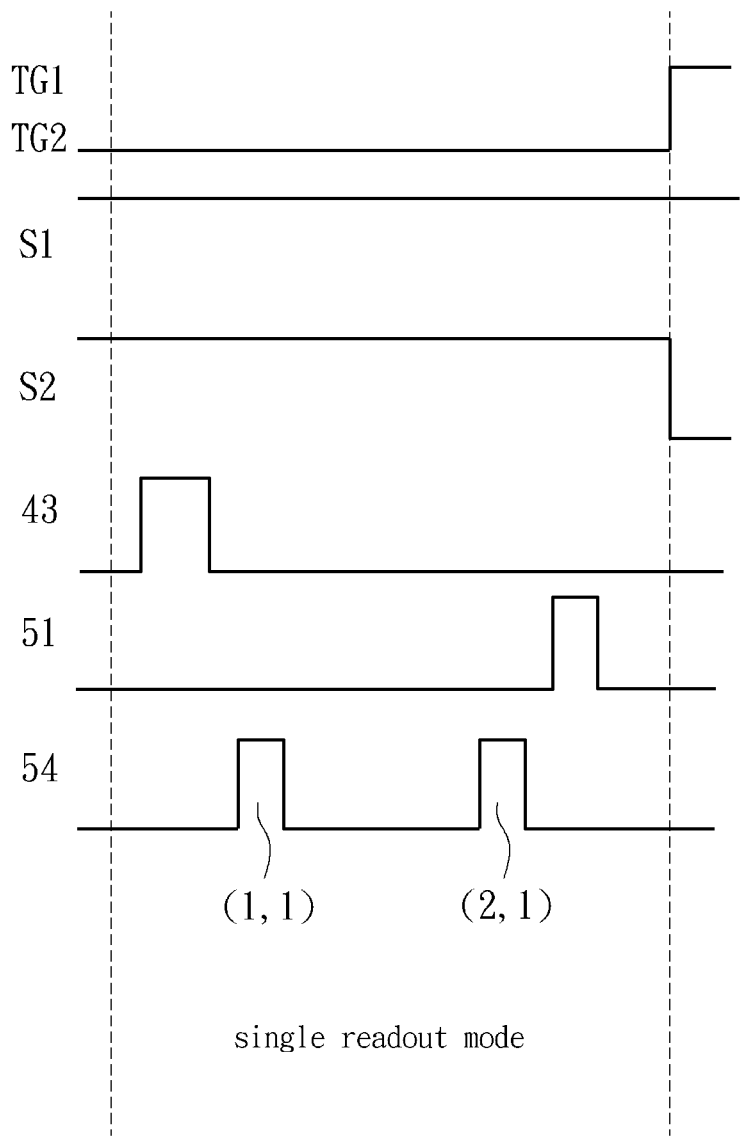
FIG. 9A is another timing diagram of the first mode of the first preferred embodiment.
Figure 9B:
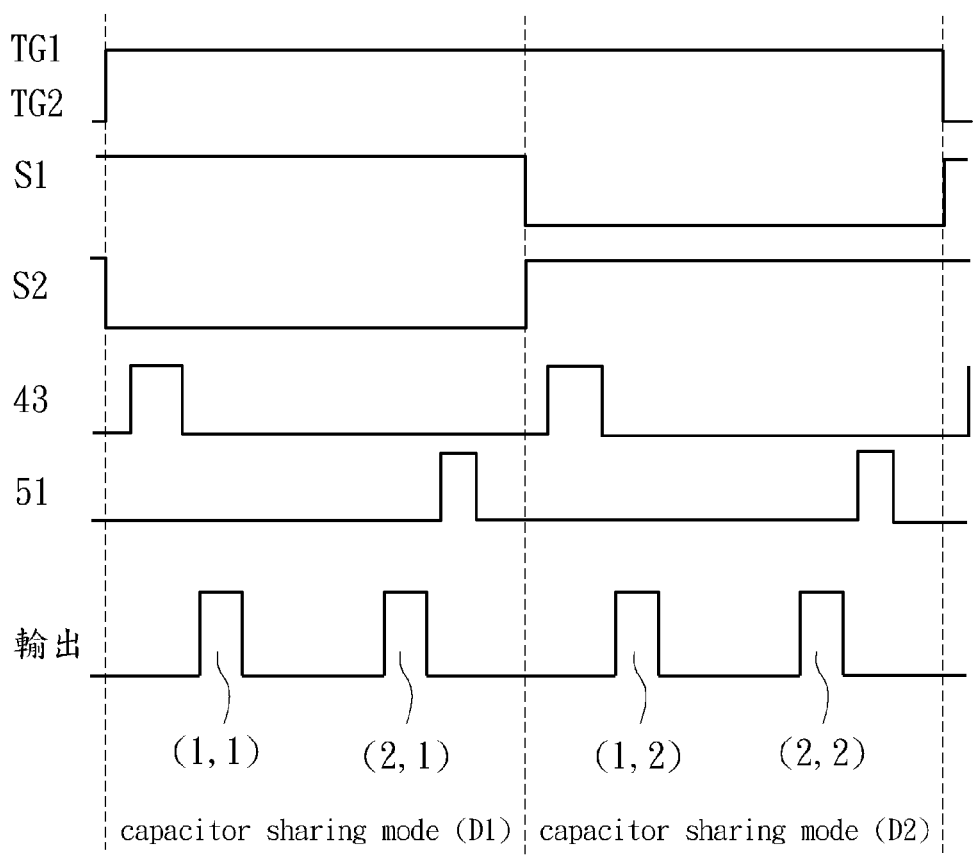
FIG. 9B is another timing diagram of the second mode of the first preferred embodiment.
Figure 9C:
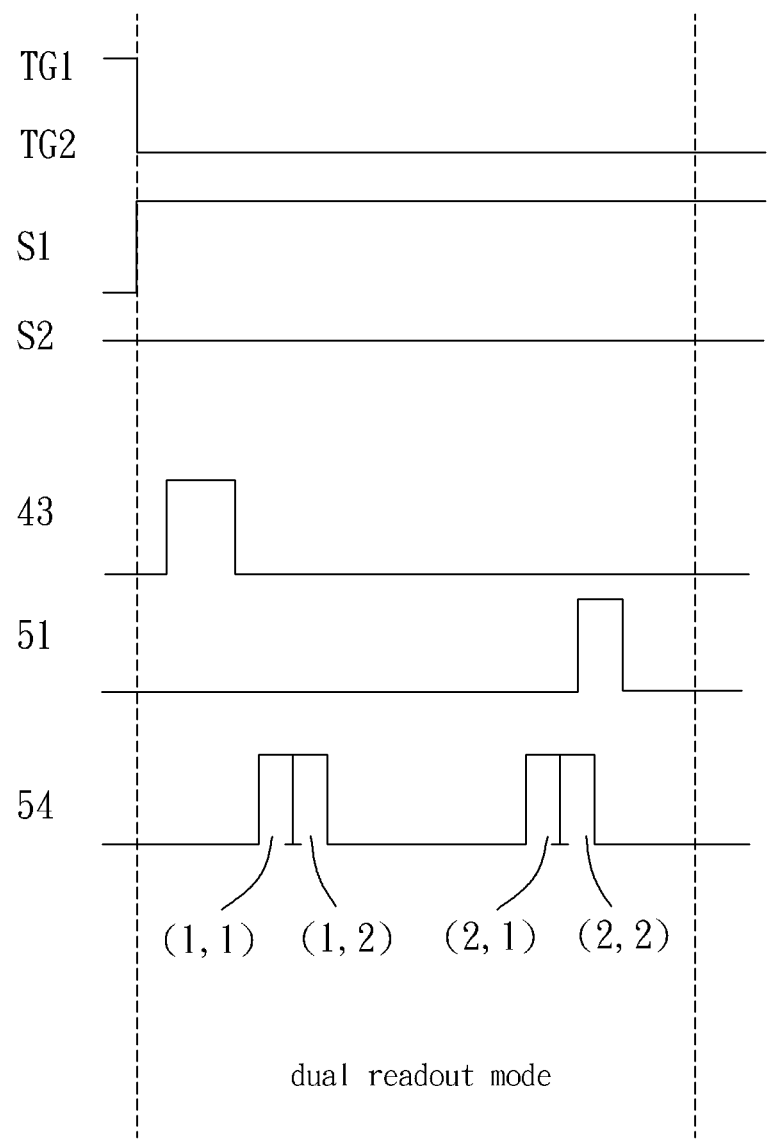
FIG. 9C is another timing diagram of the third mode of the first preferred embodiment.

FIGS. 9A, 9B, and 9C shows timing diagrams of the three operating modes of the dual function injection-type readout array device, and are respectively a single readout mode, a capacitor sharing mode, and a dual readout mode. The timings of the operations of the switches TG1, TG2, S1, S2, 43 and 51 of the three operating modes are the same as those described above, and are therefore not described herein. (1,1) represents the output switch 54 in the first readout unit 31 of the first dual function readout module 61 being controlled, by the ON/OFF control unit 64, to conduct to provide the output voltage VOUT to the amplifier 63. Representations of (1,2), (2,1) and (2,2) can be inferred from the aforesaid representation of (1,1).

As best shown in FIG. 3, the amplifier 63 is electrically coupled to the dual function injection-type readout array device to receive one of the output voltages and to amplify and obtain a readout signal.

Figure 10:
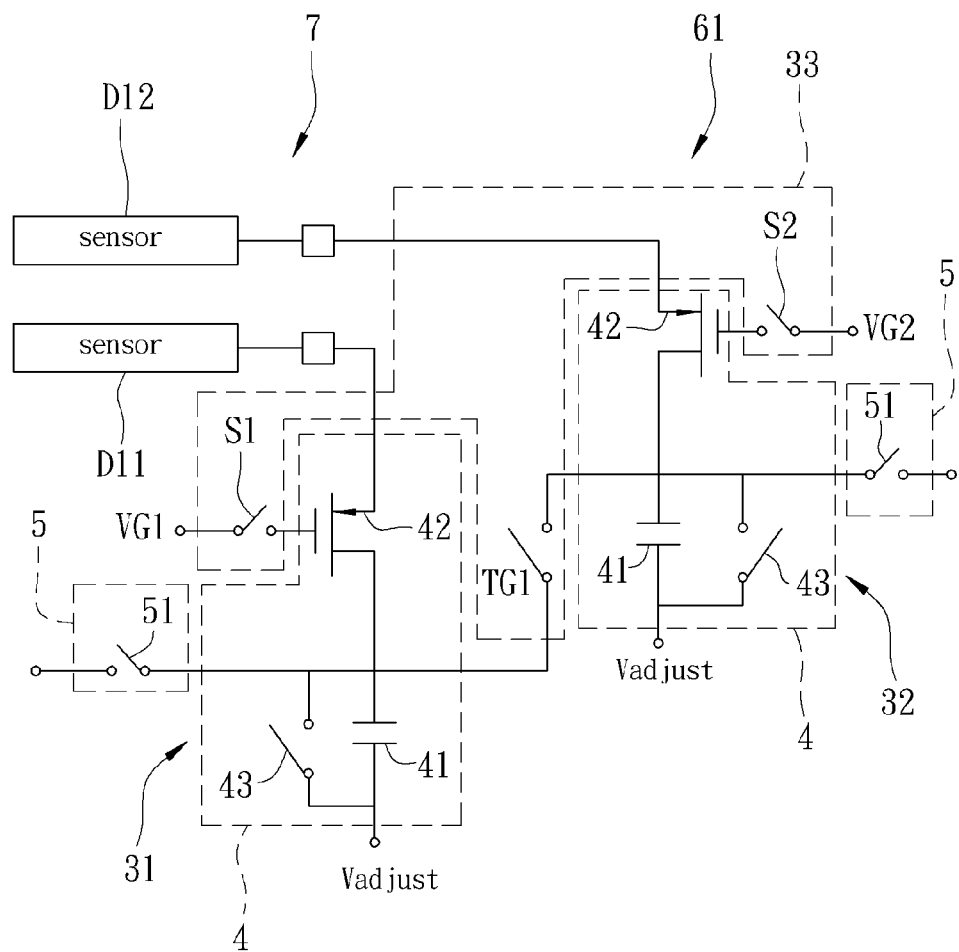
FIG. 10 is a circuit diagram of the second preferred embodiment of a dual function readout module according to the present invention.

FIG. 10 shows the second preferred embodiment of the dual function injection-type array readout device of the present invention. The difference between the second preferred embodiment and the first embodiment is as follows: The two sensors of each sensor group D11, D12, D21 and D22 are biological sensors for sensing different types of biological ions. The biological ions (such as urea or glucose) serve as the corresponding sensed target. The biological sensors generate a sense current having a magnitude that is directly proportional to the concentration of the biological ions. The magnitude of the integration voltage is also directly proportional to the concentration of the biological ions. As the period required to respond to the sensing of the concentration of the ions for the biological sensors is longer, the response is comparatively slower than the light sensors, and the second preferred embodiment (FIG. 10) is different from the first preferred embodiment (FIG. 3) in one other way: The sample-and-hold device 5 of the dual function readout module has a readout switch 51. The readout switch 51 has a first terminal electrically coupled to the second terminal of the transistor 42 to receive the integration voltage, and a second terminal, and is operable to switch between conducting and non-conducting states for controlling output of the integration voltage as the output voltage at the second terminal of the readout switch 51. The timing control of the readout switch 51 is similar to that in the first preferred embodiment, and is therefore not described herein.

From the above description, the embodiments of this invention have the following advantages:

1. The dual function readout module 61 increases the integration capacitance, by having the capacitor sharing mode, to solve the problem of the integration oversaturation.
2. The dual function readout module 61 can switch between sensing single wavelength or double wavelength infrared signals.
3. The dual function readout module 61 can be applied to a light sensor or a biological sensor.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A dual function injection type array readout device, comprising:
    at least two sensor groups, each of said sensor groups having two sensors of different functions, each of said sensors generating a sense current according to a corresponding sensed target; and
    a dual function injection type array readout circuit including:
        at least two dual function readout modules, each including:
            two readout units, each electrically coupled to a respective one of said sensors of a corresponding one of said sensor groups, each of said readout units including:
                a current-to-voltage converter having an integration capacitor, being electrically coupled to the respective one of said sensors, and controllable to selectively receive the sense current from the respective one of said sensors, wherein when said current-to-voltage converter receives the sense current, the sense current is stored in said integration capacitor for conversion into an integration voltage that is proportional to the magnitude of the sense current; and
                a sample-and-hold device electrically coupled to said current-to-voltage converter, and controllable to sample and hold the integration voltage to obtain an output voltage that is proportional to the magnitude of the sense current; and
            a switch unit electrically coupled to said integration capacitors of said readout units, and controllable to selectively connect said integration capacitors in parallel with each other.

2. The dual function injection type array readout device as claimed in claim 1, wherein said integration capacitor of each of said readout units has a first terminal to provide the integration voltage and a second terminal to receive a calibration voltage, and said current-to-voltage converter of each of said readout units further has:
    a transistor having a first terminal electrically coupled to the respective one of said sensors, a second terminal electrically coupled to said first terminal of said integration capacitor of the corresponding one of said readout units, and a control terminal; and
    an integration reset switch arranged parallel to said integration capacitor of the corresponding one of said readout units, operable to switch between conducting and non-conducting states, and clearing charge stored by said integration capacitor of the corresponding one of said readout units when operated in the conducting state.

3. The dual function injection type array readout device as claimed in claim 2, wherein said sample-and-hold device of each of said readout units includes:
    a readout switch having a first terminal electrically coupled to said second terminal of said transistor of said current-to-voltage converter of the corresponding one of said readout units, and a second terminal, said readout switch being operable to switch between conducting and non-conducting states;
    an output switch having a first terminal electrically coupled to said second terminal of said readout switch, and a second terminal to provide the output voltage, said output switch being operable to switch between conducting and non-conducting states;
    a sampling capacitor having a first terminal electrically coupled to said second terminal of said readout switch, and a grounded second terminal; and
    a sampling reset switch arranged parallel to said sampling capacitor, operable to switch between conducting and non-conducting states, and clearing charge stored by said sampling capacitor when operated in the conducting state.

4. The dual function injection type array readout device as claimed in claim 3, wherein said readout units are a first readout unit and a second readout unit, respectively, said switch unit being operable to selectively transmit a first bias voltage to said control terminal of said transistor of said current-to-voltage converter of said first readout unit, and being further operable to selectively transmit a second bias voltage to said control terminal of said transistor of said current-to-voltage converter of said second readout unit, said switch unit being electrically coupled to said first terminals of said sampling capacitors of said first and second readout units and being controllable to selectively connect said sampling capacitors of said first and second readout units in parallel with each other.

5. The dual function injection type array readout device as claimed in claim 4, wherein said switch unit includes:

a first bias voltage switch having a first terminal to receive the first bias voltage and a second terminal electrically coupled to said control terminal of said transistor of said current-to-voltage converter of said first readout unit, operable to switch between conducting and non-conducting states, and transmitting the first bias voltage to said control terminal of said transistor of said current-to-voltage converter of said first readout unit when operated in the conducting state;

a second bias voltage switch having a first terminal to receive the second bias voltage and a second terminal electrically coupled to said control terminal of said transistor of said current-to-voltage converter of said second readout unit, operable to switch between conducting and non-conducting states, and transmitting the second bias voltage to said control terminal of said transistor of said current-to-voltage converter of said second readout unit when operated in the conducting state;

an integration parallel switch having a first terminal electrically coupled to said first terminal of said integration capacitor of said current-to-voltage converter of said first readout unit, and a second terminal electrically coupled to said first terminal of said integration capacitor of said current-to-voltage converter of said second readout unit, and operable to switch between conducting and non-conducting states, said integration parallel switch connecting said integration capacitors of said first and second readout units in parallel with each other when operated in the conducting state; and a sampling parallel switch having a first terminal electrically coupled to said first terminal of said sampling capacitor of said sample-and-hold device of said first readout unit, and a second terminal electrically coupled to said first terminal of said sampling capacitor of said sample-and-hold device of said second readout unit, and operable to switch between conducting and non-conducting states, said sampling parallel switch connecting said sampling capacitors of said first and second readout units in parallel with each other when operated in the conducting state.

6. The dual function injection type array readout device as claimed in claim 2, wherein said sensors of each of said sensor groups are biological sensors for sensing different kinds of biological ions, respectively, the biological ions serving as the corresponding sensed target, the sense current generated by each of said biological sensors having a magnitude proportional to concentration of the corresponding sensed target, said sample-and-hold device of each of said readout units including:

a readout switch having a first terminal electrically coupled to said second terminal of said transistor of said current-to-voltage converter of the corresponding one of said readout units so as to receive the integration voltage, and a second terminal, said readout switch being operable between conducting and non-conducting states for controlling output of the integration voltage as the output voltage at said second terminal of said readout switch.

7. The dual function injection type array readout device as claimed in claim 1, wherein said sensors of each of said sensor groups are for sensing infrared signals having different wavelengths, respectively, and each of said sensors includes:

a photo-transmission diode having a cathode to receive a reference bias voltage and an anode electrically coupled to said current-to-voltage converter of the respective one of said readout units.

8. A dual function injection type array readout circuit for use with at least two sensor groups, each of the sensor groups having two sensors of different functions, each of the sensors generating a sense current according to a corresponding sensed target, said dual function injection type array readout circuit comprising:

at least two dual function readout modules, each including:
  two readout units, each to be electrically coupled to a respective one of the sensors of a corresponding one of the sensor groups, each of said readout units including:
    a current-to-voltage converter having an integration capacitor, to be electrically coupled to the respective one of the sensors, and controllable to selectively receive the sense current from the respective one of the sensors, wherein when said current-to-voltage converter receives the sense current, the sense current is stored in said integration capacitor for conversion into an integration voltage that is proportional to magnitude of the sense current; and
    a sample-and-hold device electrically coupled to said current-to-voltage converter, and controllable to sample and hold the integration voltage to obtain an output voltage that is proportional to the magnitude of the sense current; and
  a switch unit electrically coupled to said integration capacitors of said readout units, and controllable to selectively connect said integration capacitors in parallel with each other.

9. The dual function injection type array readout circuit as claimed in claim 8, wherein said integration capacitor of each of said readout units has a first terminal to provide the integration voltage and a second terminal to receive a calibration voltage, and said current-to-voltage converter of each of said readout units further has:

a transistor having a first terminal to be electrically coupled to the respective one of the sensors, a second terminal electrically coupled to said first terminal of said integration capacitor of the corresponding one of said readout units, and a control terminal; and an integration reset switch arranged parallel to said integration capacitor of the corresponding one of said readout units, operable to switch between conducting and non-conducting states, and clearing charge stored by said integration capacitor of the corresponding one of said readout units when operated in the conducting state.

10. The dual function injection type array readout circuit as claimed in claim 9, wherein said sample-and-hold device of each of said readout units includes:

a readout switch having a first terminal electrically coupled to said second terminal of said transistor of said currentto-voltage converter of the corresponding one of said readout units, and a second terminal, said readout switch being operable to switch between conducting and non-conducting states;

an output switch having a first terminal electrically coupled to said second terminal of said readout switch, and a second terminal to provide the output voltage, said output switch being operable to switch between conducting and non-conducting states;

a sampling capacitor having a first terminal electrically coupled to said second terminal of said readout switch, and a grounded second terminal; and a sampling reset switch arranged parallel to said sampling capacitor, operable to switch between conducting and non-conducting states, and clearing charge stored by said sampling capacitor when operated in the conducting state.

11. The dual function injection type array readout circuit as claimed in claim 10, wherein said readout units are a first readout unit and a second readout unit, respectively, said switch unit being operable to selectively transmit a first bias voltage to said control terminal of said transistor of said current-to-voltage converter of said first readout unit, and being further operable to selectively transmit a second bias voltage to said control terminal of said transistor of said current-to-voltage converter of said second readout unit, said switch unit being electrically coupled to said first terminals of said sampling capacitors of said first and second readout units and being controllable to selectively connect said sampling capacitors of said first and second readout units in parallel with each other.

12. The dual function injection type array readout circuit as claimed in claim 11, wherein said switch unit includes:

a first bias voltage switch having a first terminal to receive the first bias voltage and a second terminal electrically coupled to said control terminal of said transistor of said current-to-voltage converter of said first readout unit, operable to switch between conducting and non-conducting states, and transmitting the first bias voltage to said control terminal of said transistor of said current-to-voltage converter of said first readout unit when operated in the conducting state;

a second bias voltage switch having a first terminal to receive the second bias voltage and a second terminal electrically coupled to said control terminal of said transistor of said current-to-voltage converter of said second readout unit, operable to switch between conducting and non-conducting states, and transmitting the second bias voltage to said control terminal of said transistor of said current-to-voltage converter of said second readout unit when operated in the conducting state;

an integration parallel switch having a first terminal electrically coupled to said first terminal of said integration capacitor of said current-to-voltage converter of said first readout unit, and a second terminal electrically coupled to said first terminal of said integration capacitor of said current-to-voltage converter of said second readout unit, and operable to switch between conducting and non-conducting states, said integration parallel switch connecting said integration capacitors of said first and second readout units in parallel with each other when operated in the conducting state; and a sampling parallel switch having a first terminal electrically coupled to said first terminal of said sampling capacitor of said sample-and-hold device of said first readout unit, and a second terminal electrically coupled to said first terminal of said sampling capacitor of said sample-and-hold device of said second readout unit, and operable to switch between conducting and non-conducting states, said sampling parallel switch connecting said sampling capacitors of said first and second readout units in parallel with each other when operated in the conducting state.

13. The dual function injection type array readout circuit as claimed in claim 9, the sensors of each of the sensor groups being biological sensors for sensing different kinds of biological ions, respectively, the biological ions serving as the corresponding sensed target, the sense current generated by each of the biological sensors having a magnitude proportional to concentration of the corresponding sensed target, wherein said sample-and-hold device of each of said readout units includes:

a readout switch having a first terminal electrically coupled to said second terminal of said transistor of said current-to-voltage converter of the corresponding one of said readout units so as to receive the integration voltage, and a second terminal, said readout switch being operable between conducting and non-conducting states for controlling output of the integration voltage as the output voltage at said second terminal of said readout switch.

14. A dual function readout module for use with two sensors of different functions, each of the sensors generating a sense current according to a corresponding sensed target, said dual function readout module comprising:

two readout units, each including:
a current-to-voltage converter having an integration capacitor, to be electrically coupled to a respective one of the sensors, and controllable to selectively receive the sense current from the respective one of the sensors, wherein when said current-to-voltage converter receives the sense current, the sense current is stored in said integration capacitor for conversion into an integration voltage that is proportional to magnitude of the sense current; and a sample-and-hold device electrically coupled to said current-to-voltage converter, and controllable to sample and hold the integration voltage to obtain an output voltage that is proportional to the magnitude of the sense current; and a switch unit electrically coupled to said integration capacitors of said readout units, and controllable to selectively connect said integration capacitors in parallel with each other.

15. The dual function readout module as claimed in claim 14, wherein said integration capacitor of each of said readout units has a first terminal to provide the integration voltage and a second terminal to receive a calibration voltage, and said current-to-voltage converter of each of said readout units further has:

a transistor having a first terminal to be electrically coupled to the respective one of the sensors, a second terminal electrically coupled to said first terminal of said integration capacitor of the corresponding one of said readout units, and a control terminal; and an integration reset switch arranged parallel to said integration capacitor of the corresponding one of said readout units, operable to switch between conducting and non-conducting states, and clearing charge stored by said integration capacitor of the corresponding one of said readout units when operated in the conducting state.

16. The dual function readout module as claimed in claim 15, wherein said sample-and-hold device of each of said readout units includes:

a readout switch having a first terminal electrically coupled to said second terminal of said transistor of said current-to-voltage converter of the corresponding one of said readout units, and a second terminal, said readout switch being operable to switch between conducting and non-conducting states;

an output switch having a first terminal electrically coupled to said second terminal of said readout switch, and a second terminal to provide the output voltage, said output switch being operable to switch between conducting and non-conducting states;

a sampling capacitor having a first terminal electrically coupled to said second terminal of said readout switch, and a grounded second terminal; and a sampling reset switch arranged parallel to said sampling capacitor, operable to switch between conducting and non-conducting states, and clearing charge stored by said sampling capacitor when operated in the conducting state.

17. The dual function readout module as claimed in claim 16, wherein said readout units are a first readout unit and a second readout unit, respectively, said switch unit being operable to selectively transmit a first bias voltage to said control terminal of said transistor of said current-to-voltage converter of said first readout unit, and being further operable to selectively transmit a second bias voltage to said control terminal of said transistor of said current-to-voltage converter of said second readout unit, said switch unit being electrically coupled to said first terminals of said sampling capacitors of said first and second readout units and being controllable to selectively connect said sampling capacitors of said first and second readout units in parallel with each other.

18. The dual function readout module as claimed in claim 17, wherein said switch unit includes:

a first bias voltage switch having a first terminal to receive the first bias voltage and a second terminal electrically coupled to said control terminal of said transistor of said current-to-voltage converter of said first readout unit, operable to switch between conducting and non-conducting states, and transmitting the first bias voltage to said control terminal of said transistor of said current-to-voltage converter of said first readout unit when operated in the conducting state;

a second bias voltage switch having a first terminal to receive the second bias voltage and a second terminal electrically coupled to said control terminal of said transistor of said current-to-voltage converter of said second readout unit, operable to switch between conducting and non-conducting states, and transmitting the second bias voltage to said control terminal of said transistor of said current-to-voltage converter of said second readout unit when operated in the conducting state;

an integration parallel switch having a first terminal electrically coupled to said first terminal of said integration capacitor of said current-to-voltage converter of said first readout unit, and a second terminal electrically coupled to said first terminal of said integration capacitor of said current-to-voltage converter of said second readout unit, and operable to switch between conducting and non-conducting states, said integration parallel switch connecting said integration capacitors of said first and second readout units in parallel with each other when operated in the conducting state; and a sampling parallel switch having a first terminal electrically coupled to said first terminal of said sampling capacitor of said sample-and-hold device of said first readout unit, and a second terminal electrically coupled to said first terminal of said sampling capacitor of said sample-and-hold device of said second readout unit, and operable to switch between conducting and non-conducting states, said sampling parallel switch connecting said sampling capacitors of said first and second readout units in parallel with each other when operated in the conducting state.

19. The dual function readout module as claimed in claim 15, the sensors being biological sensors for sensing different kinds of biological ions, respectively, the sense current generated by each of the biological sensors having a magnitude proportional to concentration of the biological ions sensed thereby, wherein said sample-and-hold device of each of said readout units includes:

a readout switch having a first terminal electrically coupled to said second terminal of said transistor of said current-to-voltage converter of the corresponding one of said readout units so as to receive the integration voltage, and a second terminal, said readout switch being operable between conducting and non-conducting states for controlling output of the integration voltage as the output voltage at said second terminal of said readout switch.

* * * * *